United States Patent [19]
Judeinstein

[11] 4,166,212
[45] Aug. 28, 1979

[54] RECIRCULATING OPTICAL DELAY LINE

[75] Inventor: André J. Judeinstein, Saint-Remy-les-Chevreuse, France

[73] Assignee: International Standard Electric Corporation, New York, N.Y.

[21] Appl. No.: 803,038

[22] Filed: Jun. 3, 1977

[51] Int. Cl.² .......................... H04B 9/00; G02B 5/14
[52] U.S. Cl. ................................ 250/199; 350/96.10; 350/96.28; 179/15 AL
[58] Field of Search .................. 343/7.7, 7.6; 250/199; 350/96.10, 96.12, 96.13, 96.28, 96.23, 96.33; 179/15 AL

[56] References Cited
U.S. PATENT DOCUMENTS

| | | | |
|---|---|---|---|
| 4,061,577 | 12/1977 | Bell | 250/199 |
| 4,089,584 | 5/1978 | Polczymski | 250/199 |

Primary Examiner—Robert L. Richardson
Assistant Examiner—Edward L. Coles
Attorney, Agent, or Firm—William T. O'Neil

[57] ABSTRACT

A reiterative delay line system utilizing an optical fiber, light transmitting (and modulating) means, light signal receiving means, and having signal multiplexing.

The (n−1) first channels of the demultiplexer are linked to the like channels of the multiplexer to delay input signals supplied to the multiplexer first channel. The light signal passes n times through the optical fiber of delay T on independent channels to provide a total overall delay of nT.

6 Claims, 5 Drawing Figures

RECIRCULATING OPTICAL DELAY LINE

BACKGROUND OF THE INVENTION

1. Field of the Invention

This invention relates to delay line systems based on propagation of light energy signals through an optical fiber.

2. Description of the Prior Art

In the prior art, various physical phenomena have been used to delay an electrical signal; for instance, for analog signals, the propagation of electrical signals in an electrical transmission line with lumped or distributed constants, the propagation of acoustic waves in solids or liquids, magnetic recording/read-out using tape, magnetic disc or drum, etc. Recent developments in the field of optical fibers have led to the design of delay lines utilizing the propagation of light signals in optical fibers. Such devices take advantages of known properties of optical fiber systems, such as very large bandwidth, insensitivity to electromagnetic noise, absence of crosstalk and security against message interception. However, proposed optical fiber delay lines are limited in performance and, in particular, the maximum obtainable delay is limited by a degradation in signal-to-noise ratio and bandwidth at the output of the system as the length of the fiber is increased.

Typical prior art optical delay line systems are shown in the patent and technical literature. U.S. Pat. No. 3,991,417 shows a fiber optic delay line system utilizing frequency (light color) discriminating reiteration.

The utility of fiber optic delay lines, and systems therefor, extends throughout the electronic arts. Two utilizations are described in U.S. patent applications Ser. No. 728,309, filed Sept. 30, 1976, and Ser. No. 597,417, filed July 21, 1975 now U.S. Pat. No. 4,028,702. Those patent applications are entitled, "MTI Canceller with Fiber Optic Delay Lines" and "Fiber Optic Phased Array Antenna System for RF Transmission", respectively, and are both assigned to the assignee of this application.

The manner in which the present invention improves upon the state of the art will be evident as this description proceeds.

SUMMARY

The general object of the invention may be said to have been the provision of an optical fiber delay line offering much longer delays while maintaining performances comparable to known systems providing shorter delays.

According to the invention, there is provided an optical fiber delay line comprising a length of optical fiber, a light transmitter to convert data in electrical form applied at its input into a light signal injected at one end of the said fiber and a receiver located at the other end of the fiber to reconstruct, from the light signal, the said data in electrical form, characterized in that it also includes an electronic multiplexing device with n channels whose output is connected to the input of the light transmitter and an electronic demultiplexing device with n channels whose input is connected to the output of the receiver, and in that the n−1 first channels of the demultiplexer are connected respectively to the n−1 last channels of the multiplexer, so as to constitute n independent transmission channels in the fiber used successively by the data to be delayed applied to the first channel of the multiplexer.

The invention will be better understood and other characteristics will be brought out in the following description and the drawings.

DESCRIPTION OF THE PREFERRED EMBODIMENT

Figure 1:
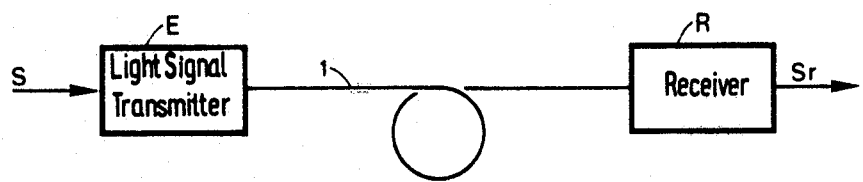
FIG. 1 represents a conventional optical fiber delay line.

FIG. 1 depicts a conventional optical fiber delay line system. The signal S to be delayed is applied to a light transmitter E which converts the data into a modulated light signal which is injected into optical fiber 1 through which it is propagated. At the output of fiber 1, the light signal is reconverted by a receiver R into a delayed electrical signal Sr. The initial information thus has undergone a delay, sum of all the propagation times through the system and, in the case of an analog transmission, a degradation of the signal-to-noise ratio as well as at least some distortion in amplitude and phase. The delay obtained depends, as is known, on the refractive index of the propagating medium and the length of the path through the fiber. In the case of fibers with "parabolic" index gradient (i.e. in which the law of variation of the refractive index is parabolic), it can be shown that propagation time is independent of the angle of the light ray with respect to the axis and is given by:

$$Tp = n_o L/c$$

in which L is the length of the path, $n_o$ the index of refraction on the axis of the fiber and c the velocity of light.

The transmitted light signal undergoes an attenuation which is proportional to the length of the line and this length is therefore limited for a given injected light power by the signal-to-noise ratio that is desired at the output. In addition, a quality factor is defined for delay circuits which is the ratio of the obtained delay to the rise time of the output signal corresponding to the injection of a unit step. This rise time depends especially upon the modal dispersions in the fiber (group velocity different for the propagation of different modes in a multimode fiber) and upon the dispersion of the propagating medium (variation of the index with the spectral component in question). The limitations thus imposed by the various parameters do not permit going beyond a certain value of delay.

The utilization of multiple-path delay lines in accordance with the principle of this invention permits going much beyond this limit. To accomplish this, the fiber is used to transmit several independent data by multiplexing and the data to be delayed are made to pass several times through the fiber on the independent channels thus defined. The time delays are thus cumulative.

A first method consists of using several pairs of light transmitters and receivers operating on different wavelengths, per the aforementioned U.S. Pat. No. 3,991,417.

The output signals from these different transmitters can thus be transmitted over the same fiber without crosstalk. The information received by the receiver of the first pair is transmitted to the transmitter of the second pair, etc. However, such a system presents certain difficult technological problems, especially in respect to filtering on the receiving side. In addition, in the case of analog transmissions, the noise powers for each passage are added up. Therefore, in order to achieve a performance substantially equivalent to that of a single line, the signal-to-noise ratio on a transmission through the multiple-path delay line must be n times greater than that over a single-path line, n being the total number of paths in the line.

Figure 2:
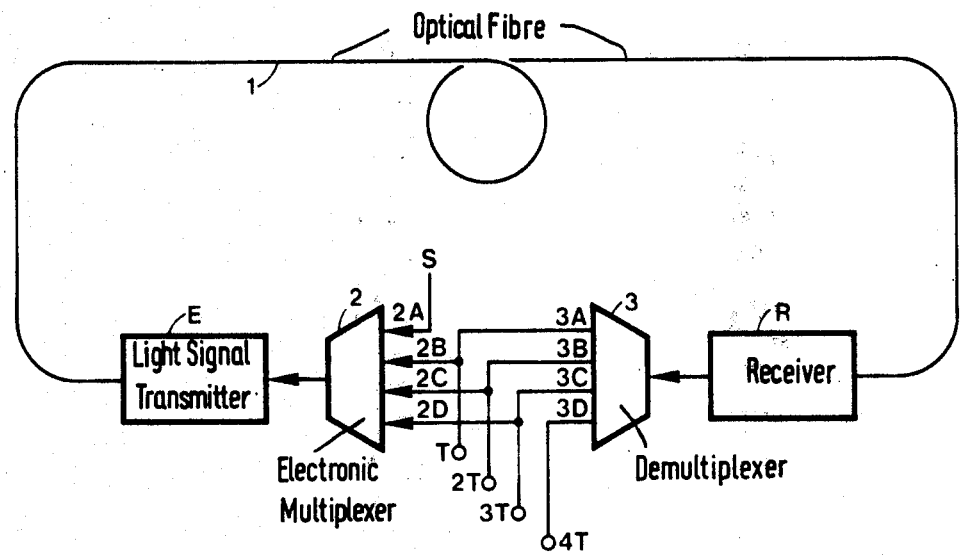
FIG. 2 is a block diagram of a delay line according to the invention.

According to the present invention, it is preferable to use the basic approach shown in FIG. 2. Several transmission channels are created on the same light signal transmitter E connected to the optical fiber 1 by electronic multiplexing, in a multiplexer 2, of the signals applied to inputs 2A to 2D. The output signal from receiver R is demultiplexed in a demultiplexer 3 whose outputs 3A to 3D furnish the signals corresponding to channels A to D, respectively. Outputs 3A, 3B and 3C are connected respectively to inputs 2B, 2C and 2D so that the signal S applied to input 2A is transmitted through the fiber successively in channels A, B, C and D in series. Output 3D will thus furnish signal S delayed by 4T if T is the total delay corresponding to one passage through the device (propagation time in the fiber itself + propagation time in the other components of the system). Intermediate outputs, i.e. outputs 3A, 3B and 3C, permit delays of T, 2T and 3T to be obtained. The choice of four channels is given only as an example, but more generally, n different channels could be used.

Any method of multiplexing (time, frequency, etc.) and any type of light energy modulation can be employed with the basic combination of the invention. Thus, frequency-division multiplex can be used with subcarriers at different frequencies which are modulated by the data in amplitude, phase or frequency. Such a system should be designed so that the intermodulation products of the subcarriers and their modulation sidebands are sufficiently small. For optimum bandwidth utilization, it is preferable to use single sideband and suppressed carrier modulation. It can be demonstrated that, due to the fact that an interval or gap should be provided between channels, the quality factor obtained is slightly lower than that of a single line of T delay. The same signal-to-noise ratio is maintained.

Figure 3:
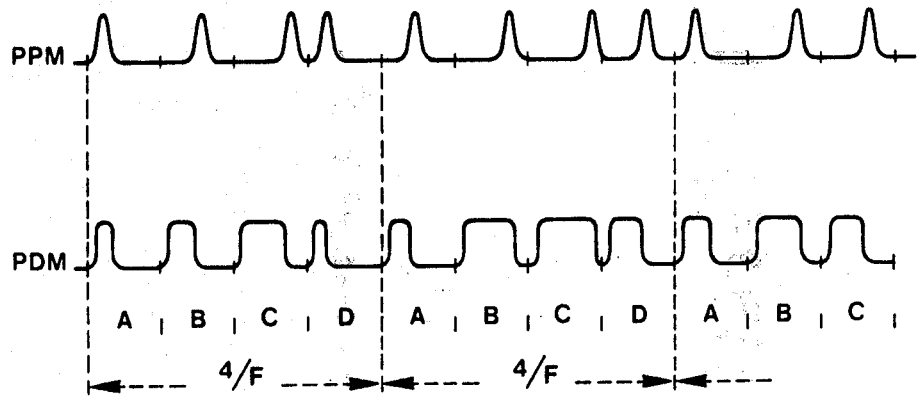
FIG. 3 shows explanatory waveforms for FIG. 2.

Another particularly interesting type of multiplexing suitable for use in the combination of the invention is time-division multiplex. The data to be delayed are sampled and coded. For coding, it is preferable to use pulse position modulation (PPM) or pulse duration modulation (PDM). An example of signals transmitted by these two types of modulation is shown in FIG. 3 in the case of four channels, A, B, C, D. The sampling frequency is equal to F/4, where F is the maximum permissible repetition frequency on the optical fiber 1. The bandwidth of the device will therefore be limited to F/8, or F/2n in the case of n channels. It can be easily demonstrated that the quality factor is then independent of n as is also the signal-to-noise ratio. If it is desired to use an intermediate tap, the quality factor then has a different value, depending upon the tap used. This can be corrected by changing the sampling frequency and the number of channels, according to the tap used.

Figure 4:
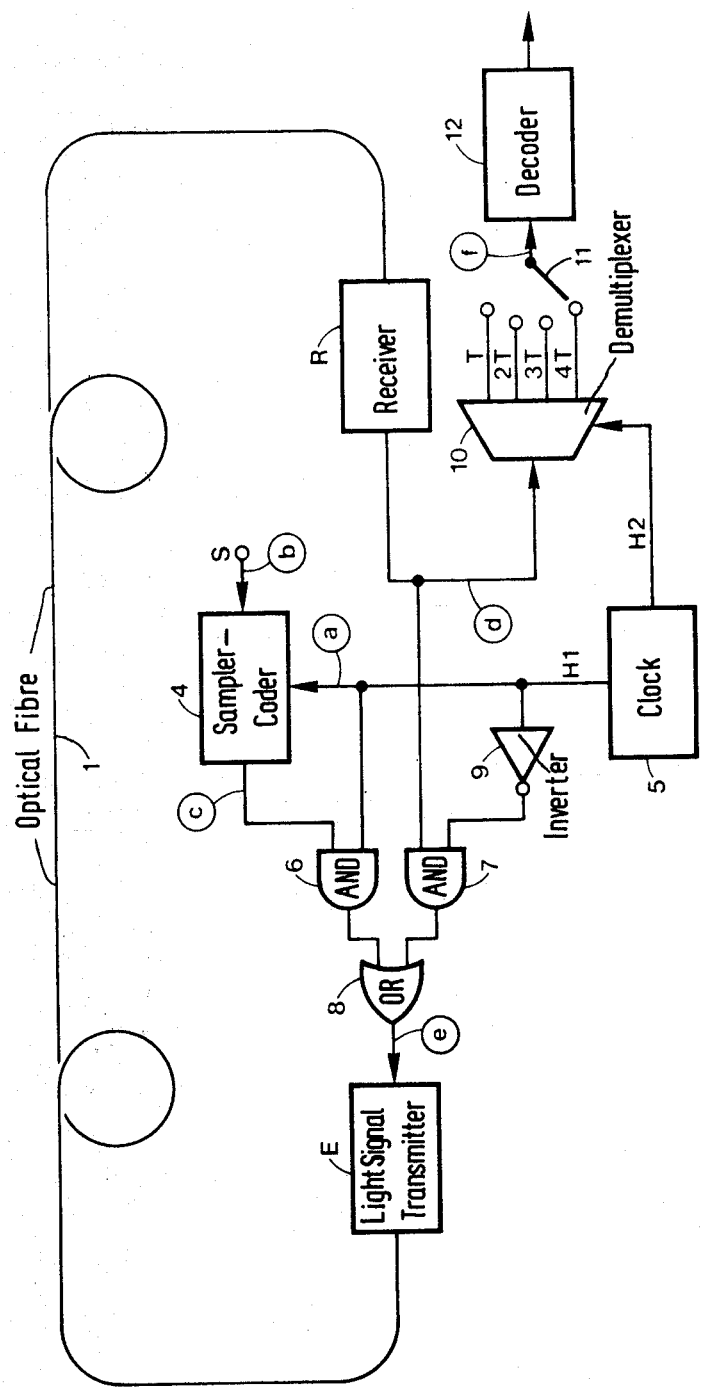
FIG. 4 is a circuit block diagram of an embodiment of a delay line system in accordance with the invention.

FIG. 4 depicts an embodiment in accordance with the invention in the case of time-division multiplexing with four channels A, B, C, D and using pulse duration modulation. One finds again in this diagram the essential elements of the delay line device of FIG. 2, namely a light transmitter E, an optical fiber 1, and a reciver R. The signal S to be delayed is applied to a sampler-coder 4 controlled by clock signals H1 supplied by a clock 5. The coded signal is transmitted to the input of transmitter E through an AND gate 6, which also receives the clock pulses H1, followed by an OR gate 8. In addition, the signals received by receiver R are also applied to the input of transmitter E through an AND gate 7, which also receives the complementary signal of clock pulses H1 through the inverter 9 and OR gate 8. The signals received by receiver R are also applied to a demultiplexer circuit 10 controlled by clock pulses H2. The outputs of the demultiplexer furnish the coded signal S delayed by T, 2T, 3T, 4T, respectively. A switch 11 is used to select the desired output and to send the coded delayed signal to a decoder 12 which reproduces the delayed signal S.

Figure 5:
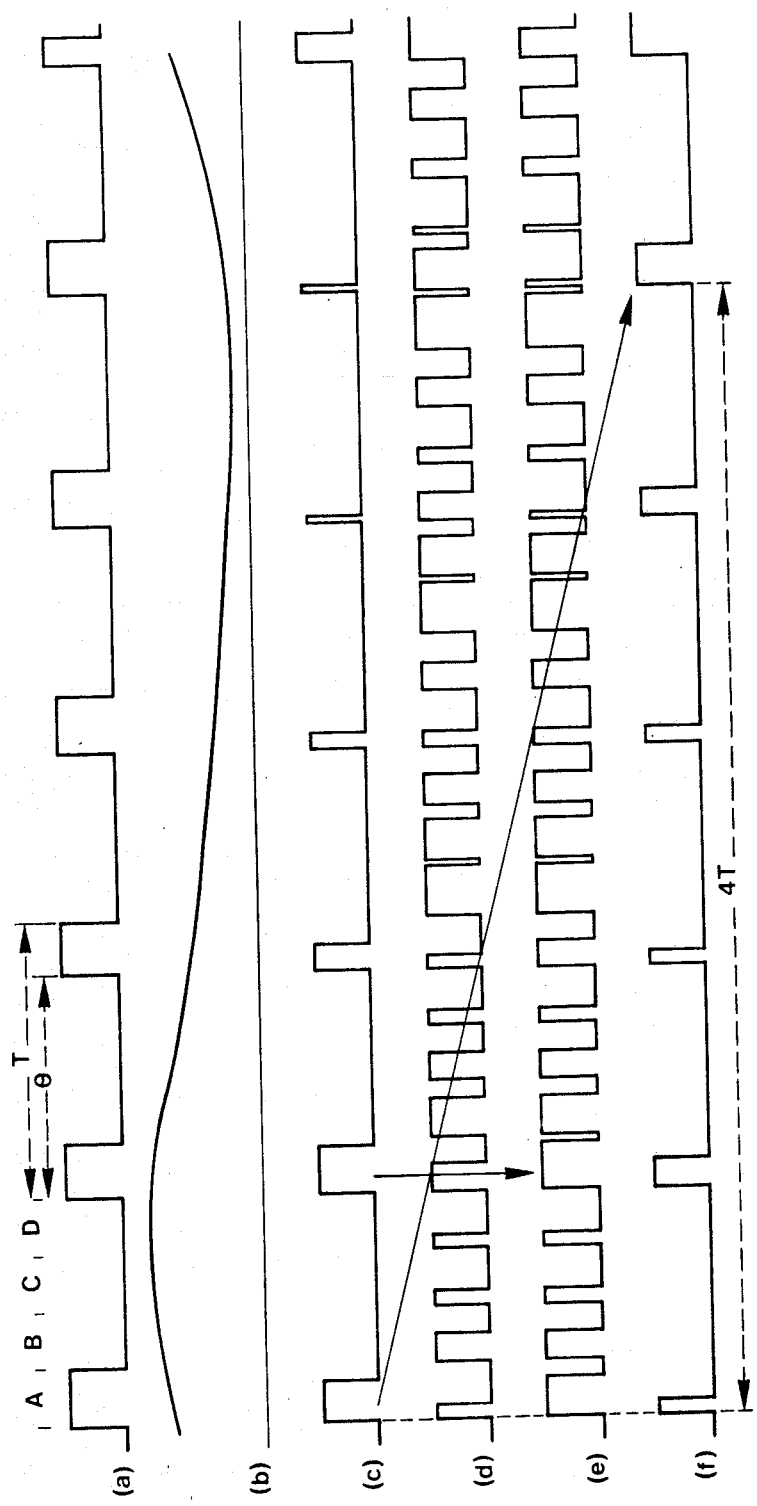
FIG. 5 shows the waveforms of signals at various points of the circuit in FIG. 4.

The operation of the device will be explained with reference to the waveforms in FIG. 5, which represent the signals at various points of the FIG. 4 circuit referenced by the encircled letters. Diagram (a) shows the clock signals H1 having a period $\theta$, with each pulse thereof having a width $\theta/n$, where n = 4 in this case, and defining the position in time of channel A. Shown in (b) of FIG. 5 is the signal S and in (c) the corresponding coded signal in pulse duration modulation (PDM). This signal is injected into the fiber at times reserved for channel A. After a first transmission, the signal is reinjected into the fiber at times reserved for channel B. Then after a second transmission it is again reinjected at times reserved for channel C, and so forth. In order to do this, the time delay T for a transmission and the clock period $\theta$ must be related as follows:

$$T = (m + (1/n))\theta,$$

in which m is any whole number and n the number of channels. In the example chosen here, n is equal to 4 and m is equal to 1. Shown in (d) is the signal at the output of receiver R resulting from the multiplexing of channels A, B, C and D. The signal at (d) is therefore reinjected by the AND gate 7 during the presence of the complement of the clock signal H1, that is to say during the times reserved for channels B, C and D. On the other hand, during the clock pulses H1 (time reserved for channel A), the corresponding pulses of the multiplexed signal (d) which correspond to the coded signal S delayed by 4T are not transmitted through gate 7 and are replaced by the pulses of the coded signal S transmitted through gate 6. This has been symbolized in FIG. 5 by the vertical arrow between signals (c) and (e), the siganl in (e) being the signal applied to the input of transmitter E. The demultiplexer 10, receiving pulses H2 of a frequency four times greater than H1, separates the signals corresponding to the various channels. Switch 11 selects the output furnishing a time up to delay 4T. The signal at this output is shown by (f) in FIG. 5. This signal reproduces the coded signal S [signal (c) in FIG. 5] with a time delay 4T, which is symbolized by the diagonal arrow in the figure.

It should be understood that the above-described example is not intended to limit the scope of the invention and that modifications and variations within the scope of the inventive concepts will suggest themselves to those skilled in the art, once the said inventive concepts are understood.

What is claimed is:

1. An optical fiber delay arrangement comprising:
an optical fiber of predetermined length;
a light energy transmitter to convert data in electrical form to be delayed and which is applied at the input of said transmitter into a modulated light signal injected at one end of said fiber;
a receiver located at the other end of the fiber to reconstruct, from said light signal, the said data in electrical form;
and reiteration means including an electronic multiplexing device with n channels whose output is connected to the input of said transmitter and an electronic demultiplexing device with n channels whose input is connected to the output of said receiver, the $n-1$ first channels of said demultiplexer being connected respectively to the $n-1$ last channels of said multiplexer, so as to constitute n independent transmission channels through said fiber, said channels being employed, successively, and said data to be delayed being applied to the first channel of said multiplexer.

2. A delay arrangement according to claim 1, further defined in that said multiplexing and demultiplexing devices are designed for time-division multiplexing and said data to be transmitted into said optical fiber are sampled and coded with a sampling frequency $1/\theta$ related to the total time delay T provided by data transmission on any one channel by the expression $T=(m+1/n)\theta$, where m is a whole number.

3. A delay arrangement according to claim 1, in which said multiplexing and demultiplexing devices are of the frequency-division multiplex type, with n subcarriers at different frequencies.

4. A delay arrangement according to claim 3, further defined in that said frequency-division multiplexing and demultiplexing devices are further defined as employing single sideband subcarrier and suppressed carrier modulation.

5. A delay arrangement according to claim 1, characterized in that coding in pulse duration modulation form is employed, and in that a sampling and coding circuit is included at the input of the first channel of said multiplexing device and an output selector switch, followed by a decoder, is placed at the output of the said demultiplexing device.

6. A delay arrangement according to claim 5, including a clock for generating clock pulses and complementary pulses characterized in that the said multiplexing device includes a first AND gate, one input of which is connected to the output of said sampling and coding circuit and the other input of which is connected to receive clock pulses of period $\theta$ and duration $\theta/n$ from said clock, a second AND gate, one input of which is connected to the output of the said receiver and the other input of which receives said complementary pulses, and an OR gate whose inputs are connected respectively to the outputs of the said AND gates and whose output is connected to the input of said transmitter.

* * * * *